United States Patent [19]

Waters

[11] 4,047,883

[45] Sept. 13, 1977

[54] THERMAL TREATMENT OF MATERIALS BY HOT PARTICULATES

[75] Inventor: Percy Lloyd Waters, North Ryde, Australia

[73] Assignee: Commonwealth Scientific and Industrial Research Organization, Campbell, Australia

[21] Appl. No.: 598,210

[22] Filed: July 23, 1975

[30] Foreign Application Priority Data

July 24, 1974 Australia .................. 8310/74

[51] Int. Cl.² .................. F27B 15/00; F23G 7/00
[52] U.S. Cl. .................. 432/14; 110/8 P; 159/16 A; 432/58
[58] Field of Search .......... 432/14, 15, 58, 197; 110/8 F; 159/16 A; 201/32

[56] References Cited

U.S. PATENT DOCUMENTS

| | | | |
|---|---|---|---|
| 2,689,787 | 9/1954 | Ogorzaly et al. | 201/32 |
| 2,789,034 | 4/1957 | Swaine et al. | 432/15 X |
| 2,977,105 | 3/1961 | Pyzel | 432/58 |
| 3,117,064 | 1/1964 | Friedrich | 432/58 |
| 3,306,236 | 2/1967 | Campbell | 110/8 F |
| 3,879,856 | 4/1975 | Barr | 432/14 |
| 3,884,620 | 5/1975 | Rammler | 432/15 |
| 3,914,876 | 10/1975 | Callcott | 432/15 |

*Primary Examiner* — John J. Camby

[57] ABSTRACT

A method of heat treating a material, particularly for the despersion and firing of wet agglomerates, slurries, sludges and the like in fluidized bed, spouting bed or spouting/fluidised bed combustors, comprises extracting hot sold particles from the bed of the combustor, mixing the hot particles and the material in a mixing chamber, and conveying at least part of the product of the admixture to the combustor. Apparatus is also provided for heat treatment of a material by this method.

19 Claims, 5 Drawing Figures

THERMAL TREATMENT OF MATERIALS BY HOT PARTICULATES

This invention concerns the use of hot particulate material from a fluidized bed, spouting bed or spouting/fluidized bed for the treatment of a material, such as the feedstock for the bed. The invention is useful, for example, for the dispersion and firing of wet agglomerates, slurries, sludges and the like in a fluidized bed, spouting bed or spouting/fluidized bed combustors, but in addition is of value in dewatering or drying watery slurries prior to firing, steam generation, evaporation and distillation of organic liquids, thermal decomposition or pyrolysis or carbonization of organic materials, filtration, gasification of carbonaceous materials, and in chemical and pyro-metallurgical reactions. Other applications of the present invention will become apparent after consideration of the following description.

Fluidized beds are known to be used for combustion of volatile products in special circumstances where routine combustion techniques are not applicable. For example, the removal of combustible insulation from electric components can be effected in a fluidized bed. Incineration of waste products in a fluidized bed has also been suggested, one arrangement for such combustion being described and illustrated in the specification of U.S. Pat. No. 3,524,633. Spouted beds are also known, being used for grain drying and peanut roasting. A recent review of the state of the art for spouted beds appeared in a paper in the "Canadian Journal of Chemical Engineering", Vol. 52, April 1974, by K. B. Mather and N. Epstein entitled "International Symposium on Spouted Beds."

As previously mentioned, the present invention may be employed in the treatment of slurries. In general, it is not practical to inject slurries (for example, coal slurries from coal washeries) directly into a fluidized bed or spouting bed combustor, because the slurry dries and tends to form large agglomerates of dry clay which may prevent fluidisation. Spraying of the slurry over the bed has been tried, but with this technique it is found that a considerable proportion of the dried coal particles become entrained in the outgoing gases. Not only do the particles escape combustion, but the cyclone which entrains the "fines" in the exit gases becomes overloaded and the fines then have to be recycled to the bed for combustion. Moreover, crushed coal rejects, when wet, tend to agglomerate into a sticky mass and are inherently difficult to disperse.

It is one object of the present invention to overcome the problems associated with the feeding of slurries and the like into fluidized bed and spouting bed combustors. However, as has already been indicated and will become apparent from the following description, the application of the present invention to other situations demonstrates additional advantages of the technique and apparatus.

Basically, in its application to feeding slurries to a combustor, the present invention includes mixing of hot particles extracted from the combustor with the slurry or similar material to be combusted, prior to injection of the slurry/particles mixture into the bed of the combustor. This mixing normally takes place in a chamber located close to the bed to minimise heat losses. Any suitable means may be used to extract the hot particles from the bed and effect reinjection of the slurry/particles mixture. Typically, a gravity extraction arrangement and screw feeding or gas-operated re-injection apparatus is used.

Thus, according to the present invention, there is provided a method of heat treating a material which comprises the steps of:
  a. extracting hot solid particles from a fluidized bed, spouting bed or spouting/fluidized bed combustor;
  b. mixing the hot particles and said material in a mixing chamber; and
  c. conveying at least part of the product of the admixture to the combustor.

Also, according to the present invention, there is provided apparatus for performing the above-stated method which comprises:
  a. means to extract hot solid particles from a fluidised bed, spouting bed or spouting/fluidized bed combustor and convey them to a mixing chamber;
  b. means to supply the material to said mixing chamber; and
  c. means to convey at least part of the product of the admixture from the mixing chamber to the combustor.

The combustor used in accordance with the present invention may be a fluidized bed or spouting bed combustor of the type well known in the art. Alternatively, the combustor may be a spouting/fluidized bed combustor as described in detail in copending U.S. patent application Ser. No. 598,823 filed July 24, 1975, now U.S. Pat. No. 4,021,193. The disclosure of that copending application is incorporated herein by reference.

The material being treated may be injected into the bed of the combuster with the particles after the mixing has taken place (e.g., in the case of a slurry of solids to be burnt in the combustor) or it may be separated from the particles (e.g., in the purification of water). The mixing may be achieved by spraying fluid material to be treated over the hot particles extracted from the combustor, or by depositing or dropping the hot particles into or onto the material. If a screw feeding arrangement is used to convey the mixed materials into the bed of the combustor, this may be integral with and an extension of a screw feeder arrangement which conveys the material to be treated to the mixing chamber. Where appropriate, the mixing chamber may be provided with extractor vents for steam or other gases, aerosols or volatilized materials, and cooling water sprays.

The present invention arose out of work to develop techniques for successfully dispersing slurries into the bed of a combustor. Initially, the dispersibility of wet agglomerates and slurries was investigated experimentally. The experiments showed that dispersibility depends in a non-linear way on the proportion of water in an aggregate formed by mixing a slurry with solid particles. In particular, aggregates containing about 15% water are difficult to disperse, and lowering the water content to less than 10% (thus providing a substantially dry mix) makes the particles relatively easy to disperse. When the water content is above about 30%, the aggregates are again dispersible.

The experiments also showed that the slurries were easier to disperse when burnt material from a combustor was mixed into a wet slurry than when additional raw solids were added (the solids were, in fact, coal washery rejects in the first experiments). The present invention demonstrates how sufficient burnt rejects can be mixed with the slurry or wet rejects to reduce the water content to less than 10%.

For a better understanding of the present invention, embodiments of it will now be described, by way of example, with reference to the accompanying drawings, in which.

Figure 1:
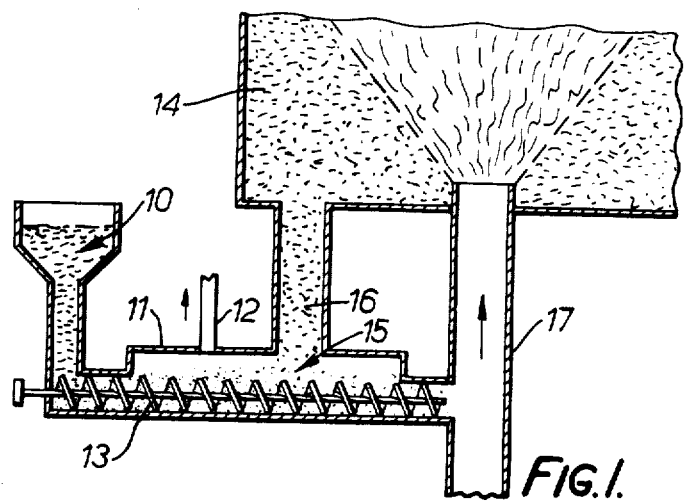
FIGS. 1 and 2 show simple mixing and feeding arrangements for spouting/fluidized and fluidized bed combustors in accordance with the present invention.

Referring to FIG. 1, a slurry 10 is fed into a mixing chamber 11 provided with a vent 12 and feeding screw 13. Hot particles from a spouting/fluidized bed combustor 14 enter the mixing chamber 11 through orifice 15 after passing through down-pipe 16 in a gravity feed arrangement. The hot particles fall onto and mix with the slurry being conveyed through the chamber by screw 13. Some of the water in the slurry evaporates and leaves the chamber as steam through vent 12. The preheated, partially dried slurry/particle mixture is then conveyed out of the chamber 11 into the air feed supply nozzle 17 of the spouting/fluidized bed. The mixture is entrained by the air in nozzle 17 and carried into the spouting bed of the combustor 14.

It will be appreciated that although a spouting/fluidized bed combustor has been used in this example, either a spouting bed or a fluidized bed combustor may be similarly employed.

Figure 2:
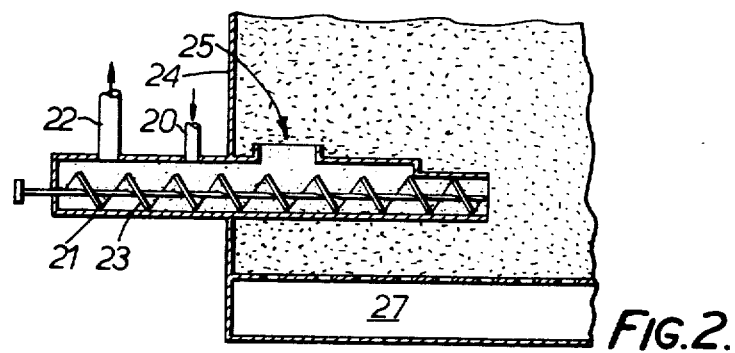

The arrangement illustrated in FIG. 2 is similar to the arrangement of FIG. 1. A slurry or similar mixture enters chamber 21, which extends into the agitated particles of fluidized bed combustor 24, and is conveyed by screw 23 into the bed. As the slurry is moved into that part of chamber 21 surrounded by the fluidized bed, it is heated by conduction through the walls of chamber 21 and by hot particles from the bed dropping into it through orifice 25. Steam and other volatiles from the slurry leave chamber 21 through vent 22 and the dried slurry, mixed with the particles from the bed, continues into the bed, where the combustible material in the slurry is burnt, using the fluidizing air 27.

Figure 3:
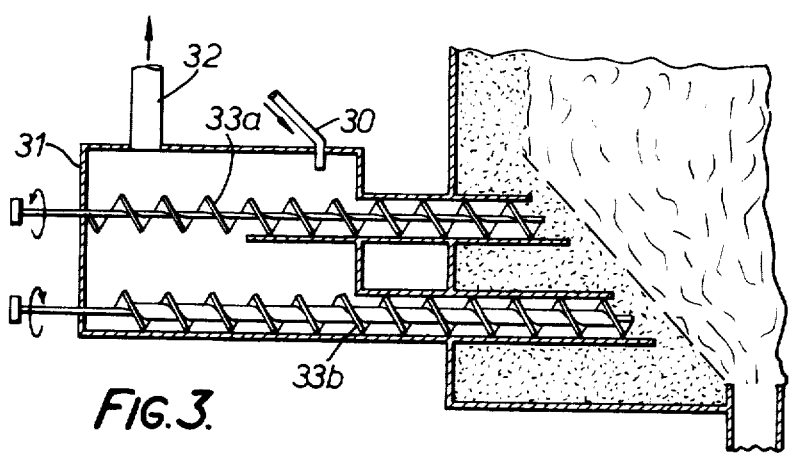
FIG. 3 illustrates a twin screw feeder-mixer system with a spouting/fluidized bed combustor.

In the two forms of apparatus already described, a single screw feed has been used. FIG. 3 shows a twin-screw arrangement, in which screw 33a extracts the hot solids from the bed of a combustor and screw 33b conveys the mixture of burnt particles and dried or partly dried raw unburnt materials into the combustor in a region where they will quickly be entrained for combustion. The raw material, for example a slurry or solvent waste, is sprayed onto the hot particles through entry tube 30 of mixing chamber 31. The steam or evaporated solvent, as the case may be, leaves chamber 31 through vent 32. The hot solids and raw uncombusted particles or sludges (e.g., coal washery rejects, paint residues or other industrial wastes) are conveyed back to the bed by the lower screw 33b.

The gases vented from the mixing chambers of the various embodiments of the present invention may be recovered as by-products for further treatment and use. Alternatively, they may be added to the fluidizing air of the combustor bed, or admixed with the waste flue gases from the bed.

If the temperature in the mixing chamber is likely to become excessive, water may be sprayed into the chamber to remove the excess heat by the formation of (additional) steam.

Appropriate protuberances may be added to the screw or screws of the apparatus, to assist the mixing process and to break up any agglomerates which may form during the drying of the slurry or other raw feedstock.

Rotary valve feeders may be used to supply material (including the hot, burnt particles) to the mixing chamber if the chamber has to operate under pressure, or has to be sealed from the combustor.

Figure 4:
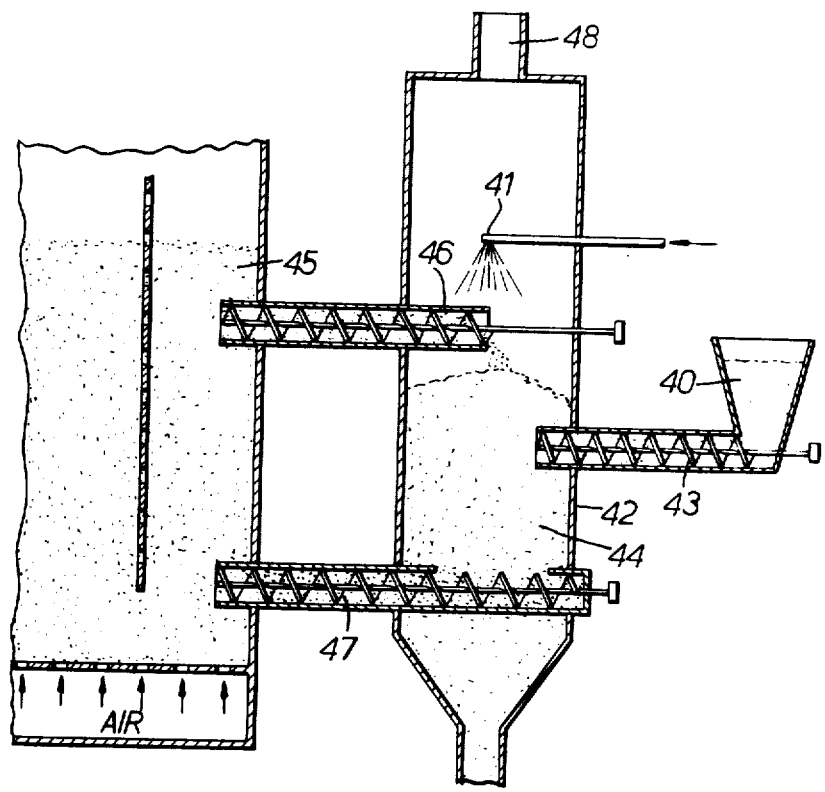
FIG. 4 shows an arrangement for admixing slurries, wastes or the like with a moving bed of burnt particles.

In certain applications, a moving bed may be required to be established in the mixing chamber. One form of this type of apparatus is illustrated in FIG. 4. From the foregoing description, the operation of this embodiment of the invention should be clear to those skilled in this art. By way of brief explanation, the slurry or material to be treated enters the mixing chamber 42 via a screw feed 43 from hopper 40 or through spray nozzle 41, into or onto the downwards moving bed 44 of hot particles. Hot particles are fed from fluidized bed combustor 45 to the top of bed 44 in the mixing chamber 42 by screw feeder 46 and the mixture conveyed back to the combustor from the lower part of the chamber 42 by screw feeder 47. Steam, evaporated solvent or the like leaves chamber 42 through vent 48.

Figure 5:
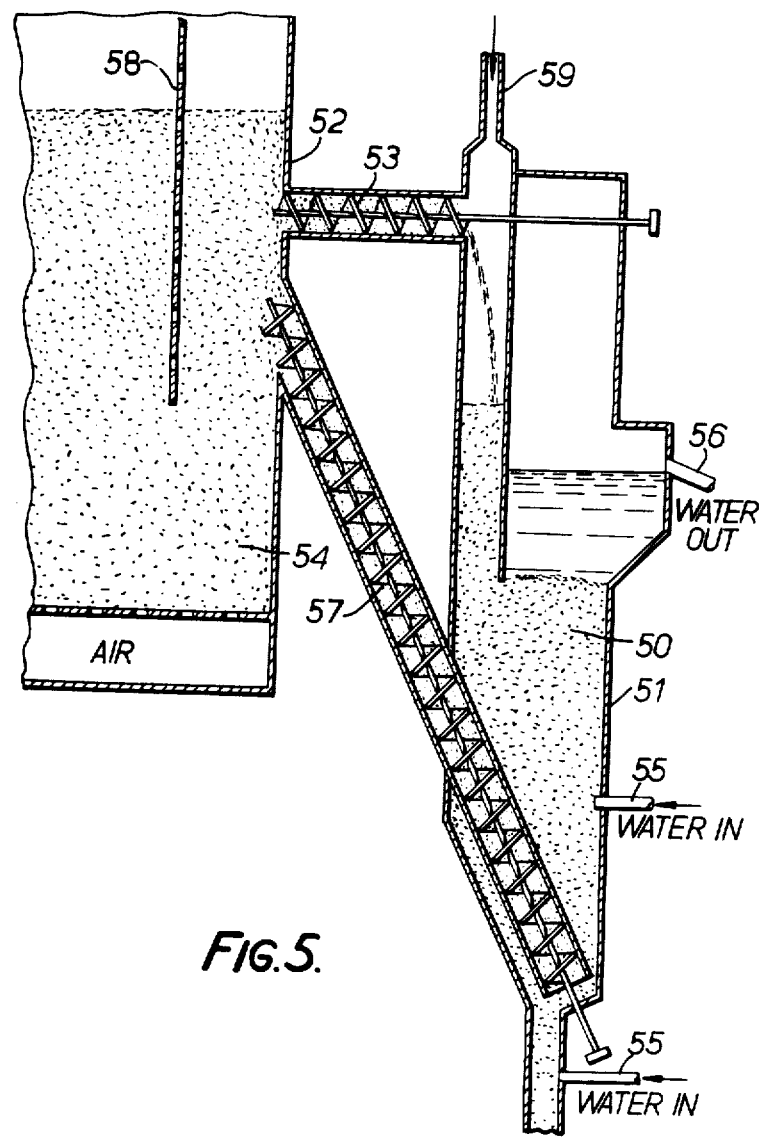
FIG. 5 depicts the use of the present invention to filter water or aqueous sludge.

Another embodiment having a moving bed in the mixing chamber is illustrated in FIG. 5. In this case the moving bed 50 in chamber 51 is used for filtration purposes. There is a continuous but slow down-flow of bed particles and an upflow of water for treatment introduced at suitable points 55 in the mixing chamber 51. The screw feeder 57 returns the moving bed particles, and solids filtered from the water, to the fluidized bed or spouting bed combustor, the particles having beed fed to chamber 51 from combustor 52 by screw feeder 53. The clarified water leaves the chamber via overflow 56. If toxic or other undesirable materials are dissolved in the water, active carbon may be added to the material of the bed 50, or produced in situ by the pyrolysis in the bed of suitable organic materials added at inlet 59 or of those solids contained in the feed water as organic slurries. The active carbon returning to the fluidized bed may be allowed to accumulate for recirculation by partitioning the fluidized bed 54 of combustor 52 by baffle 58 and operating this part of the bed 54 under non-combustion conditions.

Further examples of the use of the present invention will now be discussed.

For steam generation, the mixing chamber should be constructed as a pressure vessel or boiler, in which pure or impure water can be flash evaporated on contacting the hot particles from a combustor bed. The steam can be used for any conventional purpose, including the production of potable water (from a brackish or undrinkable water supply) by condensing the steam. The present system offers very high evaporation rates compared with conventional boiler systems, which rely on heat transfer from hot gas to water across metal surfaces.

The present invention may also be used for pyrolysis. Organic materials, in gaseous, liquid, or solid form, may be thermally decomposed, pyrolysed, or carbonized by injecting them into the mixing chamber and allowing them to come into contact with the hot particles from the combustor bed. With bed particles in the temperature range 300°–600° C, low-temperature cracking may be achieved; for more intensive cracking higher temperatures may be used. The gases and volatile matter (e.g., tar) may be recovered as by-products; the carbonaceous residue may be burnt in the combustor, or separated from the bed material.

In addition, the present invention may be used to carry out special thermal treatments, such as the regeneration of active carbons (e.g., those used in waste water treatment as indicated previously) or the demethylation of alkylated aromatic hydrocarbons to yield benzene and toluene for which there is an increasing demand.

A further use of the present invention is in the chemical treatment of inorganic wastes. Some types of waste water contain ferrous and non-ferrous metals in the form of slurries and dissolved salts which may have to be removed from the water before it can be disposed into streams and rivers. It is a well-known and common practice that many metals present as dissolved salts may be precipitated as sulphides or as hydroxides by allowing the solution to react with the sulphides, hydroxides or carbonates of alkalis or alkali earths such as lime. A common physico-chemical method of treating inorganic wastes of the types described above is digesting with limestone. The metal precipitate is usually filtered and disposed as a pulp on land or at sea. The apparatus of the present invention may be used for the evaporation and drying of inorganic solutions, and in some cases the thermal decomposition of the dried salts such a pickling solutions containing ferric chloride. The hydrochloric acid vapours evolving may be condensed and absorbed.

The advantage of this system over that of feeding pickling liquors into the fluidized-bed incinerator is that the acid vapors are not diluted with large volumes of waste combustion gases.

The present apparatus may also be used for the wet treatment of inorganic liquors from which, using suitable reagents, the metals may be precipitated and filtered out by the bed material for disposing as wet solid waste or for feeding into a fluidized-bed incinerator where the metallic compounds would be normally converted to oxides. The fluidized-bed could contain limestone which would act as a reagent when recirculated into the treatment vessel.

Yet another example of the use of the present invention is in the thermal decomposition of noxious halogenated compounds. Many organic industrial wastes such as chlorinated solvents, polyvinyl chloride, chlorophenols and insecticides, contain organically-combined chlorine. A common method of disposing such compounds is to burn them in an incinerator and the chlorine is converted to mainly hydrochloric acid which is evolved with the combustion gases and has to be scrubbed out using expensive non-corrosive equipment. Using the apparatus of the present invention with hot particles at a temperature above 600° C, the compounds are thermally decomposed and the volatile products containing hydrochloric acid may be trapped, while the carbonaceous residue (relatively free from chlorine) is circulated into the incinerator.

Cyanide wastes may be similarly treated.

The present invention may also be used in pyrometallurgical treatments. The conventional method of extracting metals from sulphide ores is to roast the ore in a fluidized-bed using air as the fluidizing medium and oxidant. In this process large quantities of sulphur dioxide diluted with nitrogen are evolved from the roaster. The metal exists in a partly oxidized form in the roasted ore. Using the present apparatus to effect the roasting, the sulphide ore is decomposed under non-oxidizing conditions and the sulphur released in elemental form for collection.

Chlorination treatments may also be carried out in the mixing chamber, for example, to separate non-ferrous metals (e.g., copper, zinc, lead) as volatile chlorides from pyrite cinder.

In using the present invention to effect gasification carbonaceous matter, such as char from coal, may be introduced to the hot bed particles, preferably at a temperature above 950° C, and gasified with steam which is generated from water also admitted to the mixing chamber. Gas containing essentially hydrogen, carbon monoxide, carbon dioxide and unconverted steam is produced. A portion of the fluidized-bed incinerator may be baffled to allow the accumulation of char by operating that portion of the bed with less than stoichiometric air supply for combustion.

Finally in this discussion of non-exhaustive examples of the use of the present invention, reference will be made to the heat treatment of large particles. The hot bed particles circulating through the mixing chamber may be used to subject to heat treatment such materials as briquettes (e.g., coal briquettes), pellets (e.g., or ore), and metal objects (e.g., for annealing or case hardening). These materials would normally be separated from the bed material by a screen arrangement in the box and the bed material fed back through the screw conveyor into the incinerator.

It should be noted that in the disposal of wastes where a number of different feedstocks have to be treated in more than one of the above ways, the fluidized-bed incinerator or combustor may be fitted with a plurality of mixing chambers. In some instances it may be required to interconnect mixing chambers so that the products from one vessel may be treated in another vessel under different conditions. For example, tars from pyrolytic treatment may be subjected to distillation treatment.

Such a system of multi-treatment could be the central unit of a liquid and solid waste disposal plant or of the processing or coal integrated with fluidized power generation.

The claims defining the invention are as follows:

1. A method of heat treating a material which comprises the steps of:
    a. removing hot solid particles from the bed of a particle bed combustor;
    b. mixing the removed hot bed particles and said material in a mixing chamber; and
    c. conveying at least part of the product of the admixture to the combustor.

2. A method according to claim 1, wherein said material comprises a slurry of solids to be combusted in said combustor, and said step of conveying comprises conveying the product of the admixture of said slurry and said hot particles to the combustor.

3. A method according to claim 1, wherein: said material comprises water containing impurities; and the product of the admixture of said water and said hot particles is conveyed to the combustor; further comprising the steps of:
    removing impurities from said water and;
    recovering water, from which impurities have been removed, from said mixing chamber.

4. A method according to claim 3, wherein said water from which impurities have been removed is recovered from said mixing chamber as steam.

5. A method according to claim 1, wherein said material comprises carbonaceous material which is treated in said mixing chamber, and said step of conveying comprises conveying carbonaceous residue to the combustor; further comprising the step of recovering gases and volatile matter from said mixing chamber.

6. A method according to claim 1, wherein said material, after mixing with said hot particles in said mixing chamber, is subjected to further treatment or treatments prior to recovery or being conveyed to the combustor.

7. A method according to claim 1, further comprising the steps of:
   thermally decomposing said material by mixing said material with said hot particles in said mixing chamber; and
   recovering gases, volatile products, and solid residues from said mixing chamber.

8. A method according to claim 1, further comprising the steps of:
   pyrolyzing said material by mixing said material with said hot particles in said mixing chammber; and
   recovering gases, volatile products, and solid residues from said mixing chamber.

9. A method according to claim 1, further comprising the steps of:
   carbonizing said material by mixing said material with said hot particles in said mixing chamber; and
   recovering gases, volatiles products, and solid residues from said mixing chamber.

10. Apparatus for heat treatment of a material which comprises:
    a mixing chamber;
    a particle bed combustor;
    means to remove hot solid bed particles from said particle bed combustor and convey them to said mixing chamber;
    means to supply the material to said mixing chamber; and
    means to convey at least part of the product of the admixture from the mixing chamber to the combustor.

11. Apparatus according to claim 10, further comprising means adapted to recover steam and other gases, aerosols and volatilized materials.

12. Apparatus according to claim 10, wherein said means to supply the material to said mixing chamber comprises means to spray fluid material over said hot particles in said mixing chamber.

13. Apparatus according to claim 10, wherein said means to remove hot solid particles and convey them to said mixing chamber comprises means to deposit said hot particles onto said material.

14. Apparatus according to claim 10 wherein said means to remove hot solid particles and convey them to said mixing chamber comprises a gravity feeder.

15. Apparatus according to claim 10 wherein at least one of said means to remove hot solid particles and convey them to said mixing chamber and said means to convey the product of the admixture from the mixing chamber to the combustor comprises at least one screw feeder.

16. Apparatus according to claim 10, wherein said means to convey the product of the admixture from the mixing chamber to the combustor comprises a screw feeder which is integral with and an extension of a screw feeder forming said means to supply said material to said mixing chamber.

17. Apparatus according to claim 10 further comprising cooling means for said mixing chamber.

18. Apparatus according to claim 10, further comprising means for recovery from said mixing chamber of at least a portion of the material after treatment in said chamber.

19. Apparatus according to claim 10, further comprising a plurality of said mixing chambers for said combustor.

* * * * *